United States Patent
Stojkovic et al.

(10) Patent No.: US 10,603,966 B2
(45) Date of Patent: Mar. 31, 2020

(54) HEADBOARD WINCH MOUNT

(71) Applicant: Ford Global Technologies, LLC, Dearborn, MI (US)

(72) Inventors: Dragan B. Stojkovic, Taylor, MI (US); Joshua R. Hemphill, White Lake, MI (US); Jack Marchlewski, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 631 days.

(21) Appl. No.: 15/214,967

(22) Filed: Jul. 20, 2016

(65) Prior Publication Data
US 2018/0022174 A1 Jan. 25, 2018

(51) Int. Cl.
*B60P 1/64* (2006.01)
*B60D 1/18* (2006.01)
*B66D 1/28* (2006.01)
*B66D 1/36* (2006.01)
*B60P 1/00* (2006.01)

(52) U.S. Cl.
CPC ............ *B60D 1/187* (2013.01); *B60D 1/185* (2013.01); *B60P 1/64* (2013.01); *B66D 1/28* (2013.01); *B66D 1/36* (2013.01); *B60P 1/00* (2013.01)

(58) Field of Classification Search
CPC . B60D 1/185; B60D 1/187; B60P 1/00; B60P 1/64; B66D 1/28; B66D 1/36
See application file for complete search history.

(56) References Cited

U.S. PATENT DOCUMENTS

| | | | | |
|---|---|---|---|---|
| 3,874,244 A * | 4/1975 | Rasmussen | ............... | B60P 1/64 403/383 |
| 4,391,379 A * | 7/1983 | Paffrath | ............... | A61G 3/0209 212/299 |
| 4,950,123 A * | 8/1990 | Brockhaus | ............... | B60P 1/00 224/403 |
| 5,242,257 A * | 9/1993 | Avakian | ............... | A61G 3/0209 224/310 |
| 5,413,450 A * | 5/1995 | Salsburg | ................... | B60P 1/64 414/401 |
| 5,525,026 A * | 6/1996 | DeMonte | .................. | B60P 1/02 410/24 |
| 6,467,790 B1 * | 10/2002 | Hurley | ..................... | B60D 1/00 280/480 |
| 6,899,238 B2 * | 5/2005 | Austin | .................. | B66C 23/166 212/175 |
| 6,981,728 B2 * | 1/2006 | Rasmussen | ............... | B60P 3/34 296/165 |

(Continued)

*Primary Examiner* — Saul Rodriguez
*Assistant Examiner* — Ashley K Romano
(74) *Attorney, Agent, or Firm* — Brooks Kushman P.C.; Vichit Chea

(57) ABSTRACT

A bed for a pickup truck includes a floor, at least two sidewalls extending perpendicular to the floor on opposite sides of the floor, a headboard connected to and disposed between the sidewalls, a mount and a plate. The mount has a base including a face defining a plurality of holes, extending across the headboard. The mount is attached to the at least two sidewalls at a first and second end of the base. The plate is configured to support a winch on the base of the mount. The plate includes a bracket to slide on the face and is configured to secure the plate at any of the plurality of holes on the face between the first and second ends.

11 Claims, 3 Drawing Sheets

(56) References Cited

U.S. PATENT DOCUMENTS

| | | | | |
|---|---|---|---|---|
| 7,070,059 B1* | 7/2006 | Flowers | ................. | B60P 1/548 |
| | | | | 212/180 |
| 7,273,333 B2* | 9/2007 | Buttrick, Jr. | ......... | B23Q 9/0042 |
| | | | | 408/1 R |
| 8,366,373 B2* | 2/2013 | Wood | ....................... | B60P 3/12 |
| | | | | 212/175 |
| 8,496,230 B1 | 7/2013 | Jiron | | |
| 8,534,978 B2* | 9/2013 | Dieziger | ................. | B60P 1/43 |
| | | | | 414/500 |
| 9,221,377 B2 | 12/2015 | Cox, Jr. | | |
| 9,333,822 B1* | 5/2016 | LaFave | .................... | B60R 9/10 |
| 9,629,276 B2* | 4/2017 | Sampath | ............. | H05K 7/1489 |
| 2011/0037362 A1* | 2/2011 | Park | .................... | A47B 88/467 |
| | | | | 312/319.1 |
| 2014/0093343 A1 | 4/2014 | Donohue | | |

* cited by examiner

HEADBOARD WINCH MOUNT

TECHNICAL FIELD

The present disclosure relates to winch mounts for pickup truck beds.

BACKGROUND

Truck bed accessories provide convenience and aid when hauling larger objects. For example a winch may be mounted to the truck bed in order to pull heavy and large objects into the truck bed. The winch may include a winch mount that attaches inside the truck bed or at a corner between the headboard and sidewalls of the truck bed. A winch mount that provides easy adaptation and attachment to the truck bed allows for larger and heavier objects to be more conveniently hauled in the truck bed. Winch mounts may be removable to account for the space needed to secure the winch either at the corner between the headboard and the sidewalls or inside the truck bed.

SUMMARY

A bed for a pickup truck includes a floor, at least two sidewalls extending perpendicular to the floor on opposite sides of the floor, a headboard connected to and disposed between the sidewalls, a mount and a plate. The mount has a base including a face defining a plurality of holes, extending across the headboard. The mount is attached to the at least two sidewalls at a first and second end of the base. The plate is configured to support a winch on the base of the mount. The plate includes a bracket to slide on the face and is configured to secure the plate at any of the plurality of holes on the face between the first and second ends.

A truck includes a bed defining a headboard between a first and second sidewall, and a mount and a plate. The mount is attached to the first and second sidewalls and extends across the headboard. The mount has a base including a plurality of holes defined on a face of the base. The plate has a bracket configured to slide along the base and attach to any of the plurality of holes via a locking pin.

A winch mount for a truck includes a base and a plate. The base has a face defining a plurality of holes spaced across an entirety of the face between a first and second end. The plate includes a bracket having a slide defining a bore extending perpendicularly from the bracket. The slide is parallel to the face to attach the plate to the base via any of the plurality of holes using a locking pin.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
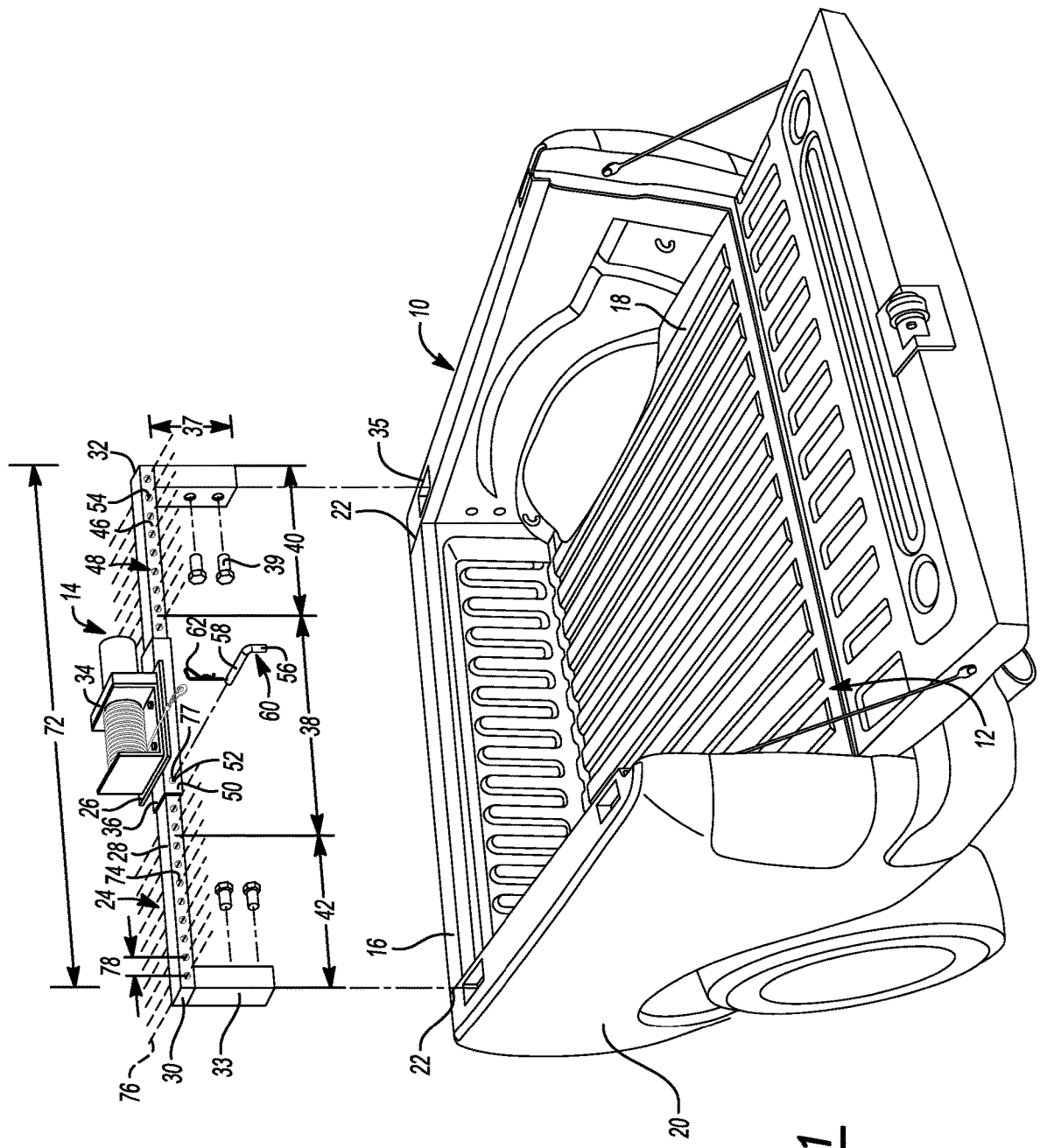
FIG. 1 is an exploded perspective view of a bed for a truck having a winch assembly.

FIG. 1 depicts an exploded perspective view of a vehicle 10 having a bed 12 and a winch assembly 14. The bed 12 attaches to the vehicle 10 at a headboard 16 and includes a floor 18 disposed between at least two sidewalls 20 at opposite ends 22 of the headboard 16. The winch assembly 14 includes a mount 24 and a plate 26. The mount 24 includes a base 28 that extends across the headboard 16 parallel to the floor 18 and between the at least two sidewalls 20. The base 28 attaches to the sidewalls 20 at a first end 30 end a second end 32. The mount 24 may be fastened, adhered, or otherwise secured to the headboard 16 at the at least two sidewalls 20 through the first and second ends 30, 32.

The mount 24 may further include at least two legs 33. The at least two legs 33 are formed on the base 28 at the first and second ends 30, 32. The at least two legs 33 provide attachment of the mount 24 to the bed 12. The bed 12 may further define at least two pockets 35 defined in the at least two sidewalls 20 of the bed 12. The at least two legs 33 are formed on the base 28 such that the at least two legs 33 are perpendicular to the base 28 to fit within the pockets 35 defined in the at least two sidewalls 20 of the bed 12. The at least two legs 33 may define a length 37 such that the base 28 provides flush attachment with the headboard 16. The legs 33 prevent the winch assembly 14 from moving along the direction of the at least two sidewalls to secure the base 28 to the headboard 16. Therefore, the force associated with moving heavy objects using the winch assembly 14 may be stabilized by using the legs 33 through the at least two sidewalls 20.

The legs 33 may be fastened to the sidewalls 20 using fasteners 39. Using fasteners 39 to secure the legs 33 to the sidewalls 20 allows the winch assembly 14 to be removable from the bed 12. In at least one other embodiment, the legs 33 may be permanently fastened to the sidewalls 20. For example, the legs 33 may be adhered or riveted within the pockets 35 to prevent the legs 33 from being removed from the pockets 35. This allows the winch assembly 14 to be permanently attached to the headboard 16 for frequent and constant use. Likewise, the base 28 may be configured to detach from the legs 33. For example, the base 28 may be fastened to the legs 33 at the first and second ends 30, 32 using removable bolts (not shown). Using bolts (not shown) to fasten the base 28 to the legs 33 allows for easy assembly and disassembly of the winch assembly 14 based on the frequency of use and optimization of storage space defined by the bed 12.

The plate 26 may be configured to support a winch 34. The plate 26 includes a bracket 36. The bracket 36 is configured to attach to the mount 24 and slide along the base 28. The bracket 36 may be configured to slide the plate 26 and the winch 34 from the first end 30 of the base 28 to the second end 32 of the base 28. The bracket 36 allows the winch assembly 14 to be adjustable. The bracket 36 may allow the winch 34 to be used in a variety of positions along the headboard 16. For example, the bracket 36 may be configured to secure the winch 34 at a center portion 38 of the base 28, a right portion 40 of the base 28, and a left portion 42 of the base 28. By adjusting the position of the winch 34 via the plate 26 in bracket 36, the winch assembly 14 may be used for a variety of hauling circumstances that may require the winch 34 to have various positions along the headboard 16.

The bracket 36 may be formed as part of the plate 26 or attached to the plate 26. For example, the bracket 36 may be integral to the plate 26 or formed separately and welded to the plate 26. Likewise, the bracket 36 may be secured to the plate 26 using adhesive. Therefore, the bracket 36 may be adapted based on the size and shape of the plate 26. Adapting the bracket 36 to the size and shape of the plate 26 allows the winch assembly 14 to be adaptable based on the size of the vehicle 10, the strength of the winch 34, or combination of the size of the vehicle 10 and the strength of the winch 34. The winch assembly 14 may be optimized based on differing uses of the winch 34 and the bed 12 of the vehicle 10.

The bracket 36 secures the plate 26 to the base 28 of the mount 24 using a locking pin 44. The locking pin 44 is configured to contact the bracket 36 and the base 28 such that the plate 26 may be secured to the mount 24 in order to use the winch 34. The base 28 may further include a face 46. The face 46 of the base 28 may define a plurality of holes 48 disposed along the face 46 between the first and second ends 30, 32. The bracket 36 may extend from the plate 26 to be parallel with the face 46. The bracket 36 may likewise define a slide 50 having a single bore 52. The slide 50 is parallel to the face 46 and secures the bracket 36 to the mount 24. By securing the bracket 36 to the mount 24, the slide 50 likewise secures the plate 26 to the mount 24. The locking pin 44 may be configured to extend through the bore 52 and into any hole 54 defined from the plurality of holes 48. Therefore, a diameter 77 of the bore 52 may be substantially equal to the diameter 74 of each hole within the plurality of holes 48. The locking pin 44 may define a first shaft 56 and a second shaft 58.

The first shaft 56 may be disposed substantially perpendicular to the second shaft 58 to form a substantial L-shape. The L-shape of the locking pin 44 allows the locking pin 44 to contact both the bracket 36 and the face 46 when inserted through the bore 52 on the slide 50 and into a hole 54 defined on the face 46. Contact between the bracket 36 and the face 46 via the locking pin 44 provides a rigid attachment between the plate 26 in the mount 24 during operation of the winch 34. The plurality of holes 48 defined on the face 46 of the base 28 may extend through the base 28. Further, the second shaft 58 of the locking pin may define a length 60 such that the second shaft 58 extends through the base 28. The second shaft 58 of the locking pin 44 may further define a key and hole assembly 62. The key and hole assembly 62 extends through the second shaft 58 of the locking pin 44 to further secure the locking pin 44 to the base 28 of the mount 24 to avoid potential slippage of the locking pin 44 during operation of the winch assembly 14.

Figure 2:
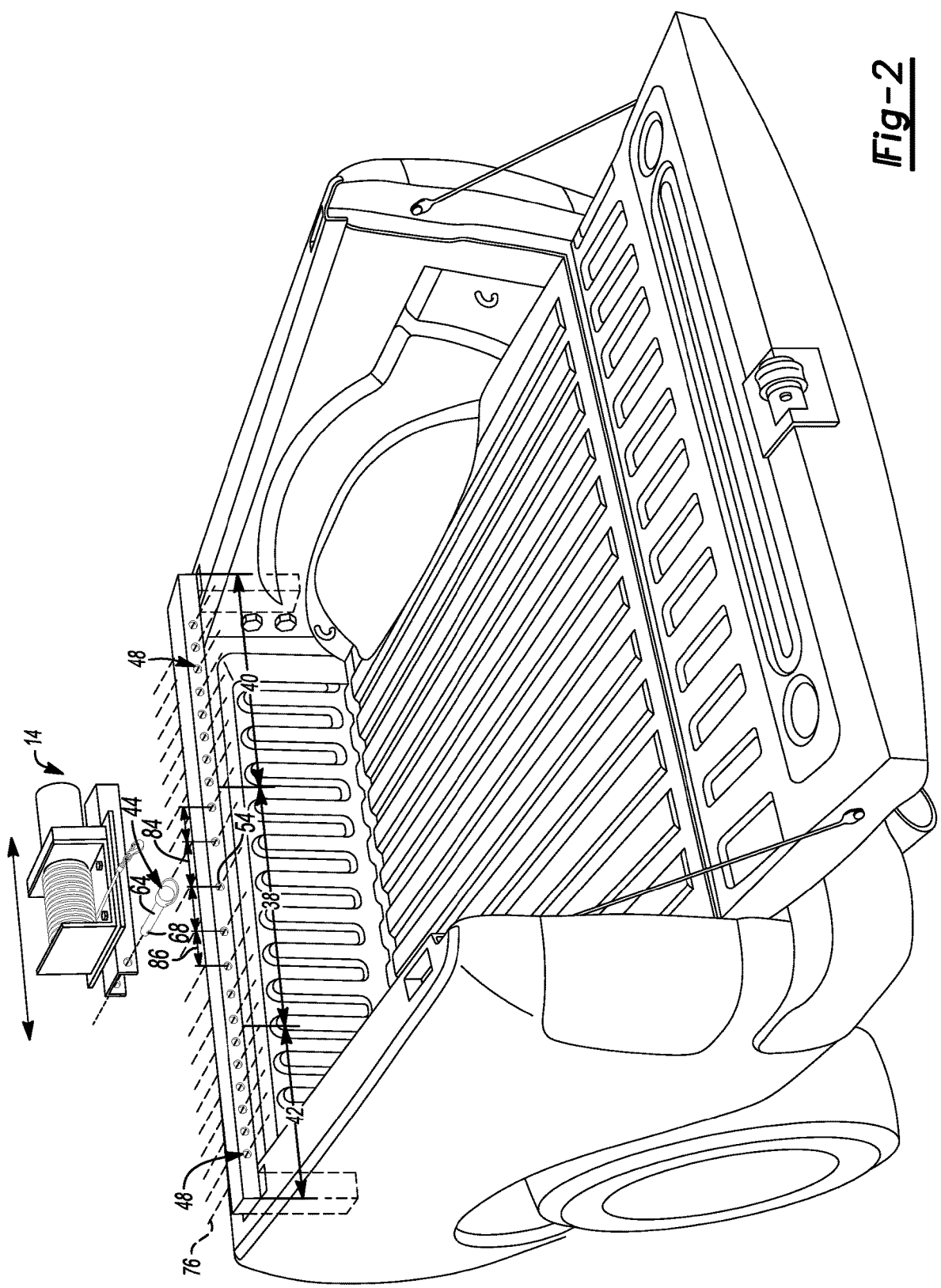
FIG. 2 is an exploded perspective view of a bed for a truck having a winch assembly including a winch mount and a cable roller disposed within a tailgate.

The locking pin 44 may also be a ball locking pin 44 shown in FIG. 2. For example, the locking pin 44 may include a single shaft 64 formed with a circular skirt 66 and at least two bearings 68 disposed opposite the circular skirt 66. The shaft 64 of the ball locking pin 44 extends through the bore 52 formed on the slide 50 of the bracket 36 and into any hole 54 defined on the face 46 the base 28. The ball locking pin 44 may define a length 70 such that the skirt 66 holds the slide 50 against the face 46 and the at least two bearings 68 extend through the base 28. In at least one other embodiment, the locking pin 44 may define a traditional nut and bolt arrangement (not shown) to attach the slide 50 to the face 46.

As stated above, the bracket 36 may be configured to secure the plate 26 to the base 28 of the mount 24 at the center portion 38, the right portion 40, and the left portion 42. Therefore, the plurality of holes 48 may be defined across an entirety 72 of the face 46 of the base 28. The plurality of holes 48, as shown in FIG. 1, may define the same size and shape spaced equidistant across the face 46 of the base 28. The plurality of holes 48 may define a diameter 74. The diameter 74 of each hole 54 within the plurality of holes 48 may be equal. Each hole 54 within the plurality of holes 48 also defines an axis 76. The plurality of holes 48 is spaced equidistant across the face 46 of the base 28 such that a distance 78 between each axis 76 of each hole 54 is equal. By equally spacing the plurality of holes 48 across the face 46 of the base 28, the winch assembly 14 may be adjusted across the entirety 72 of the face 46. As detailed above, this allows the winch assembly 14 to account for multiple uses in multiple circumstances for the winch assembly 14.

Figure 3:
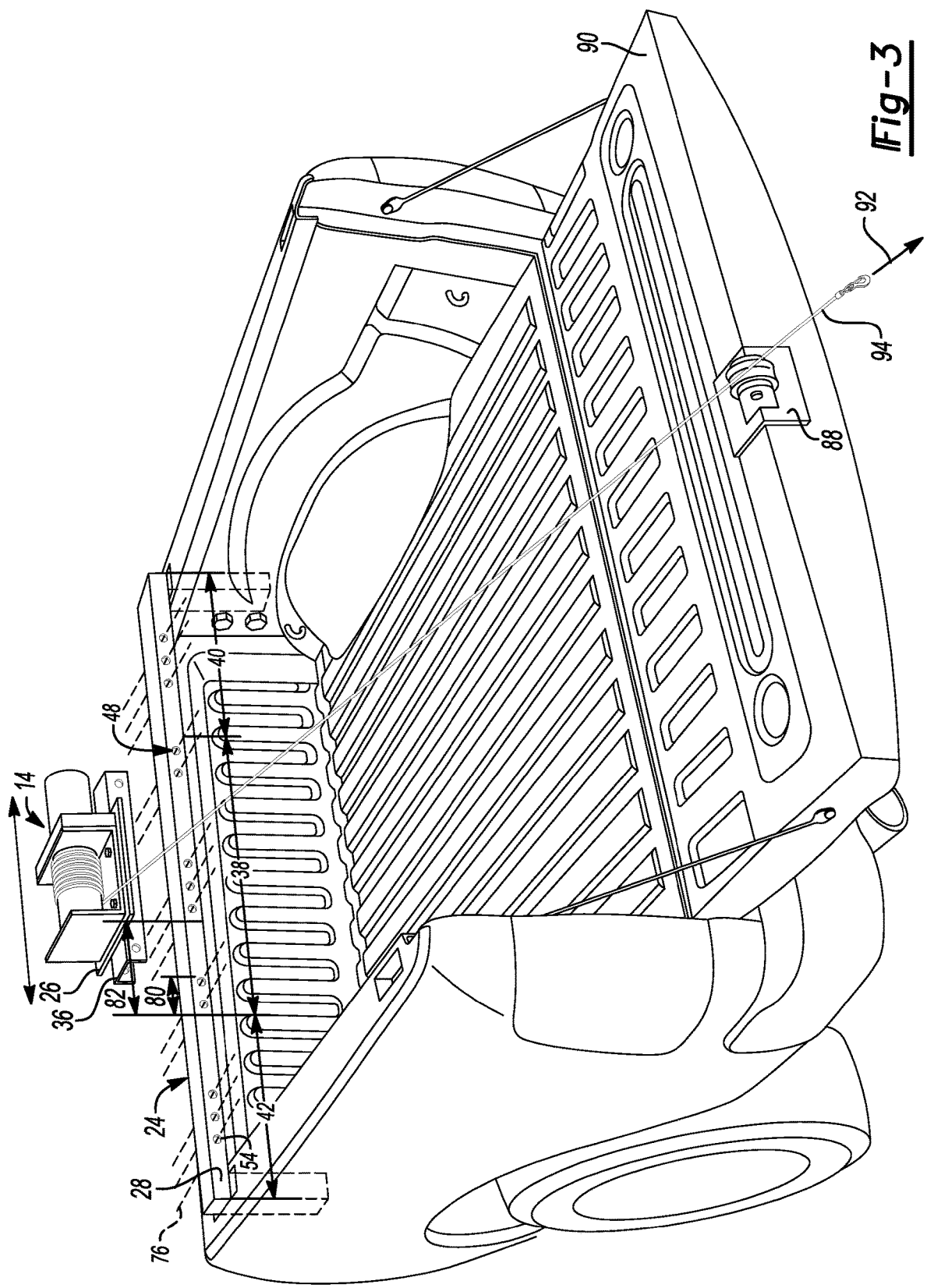
FIG. 3 is a perspective view of a bed for a truck having a winch mount including a cable extending from a winch mount and through a cable roller.

As depicted in FIG. 3, the plurality of holes 48 may also be defined within the center portion 38, the right portion 40, or the left portion 42 only. The plurality of holes 48 may define a range 80 within which the bracket 36 can secure the plate 26 to the base 28. The range 80 may be defined within the center portion 38, the right portion 40, or the left portion 42 on the face 46 of the base 28. The range 80 of the plurality of holes 48 may encompass the entire center portion 38, the right portion 40, or the left portion 42. In at least one other embodiment, the range 80 of the plurality of holes 48 may encompass a section 82 defined within the center portion 38, the right portion 40 or the left portion 42. Defining the plurality of holes 48 on various areas of the base 28 further allows the winch assembly 14 to be adjustable for certain circumstances. The range 80 may provide adjustability of the winch assembly 14 during occasions of specific use for varying objects size.

The plurality of holes 48 may also be defined with a varying distance between each axis 76 of each hole 54. For example, as depicted in FIG. 2, a first distance 84 defined between each axis 76 may be greater than a second distance 86 defined between each additional axis 76 of each hole 54 throughout the plurality of holes 48. As the plurality of holes 48 spreads across the entirety 72 of the face 46 of the base 28, the distance between each axis 76 of each hole 54 may gradually decrease such that the first distance 84 is the greatest distance. The first distance 84 may be defined starting at the holes 54 of the plurality of holes 48 disposed at the center portion 38. If the first distance 84 is defined from the hole 54 at the center portion 38, then the first distance 84 may be measured between the axis 76 from the center most hole 54 and the axis 76 from each of the next adjacent holes 54. Stated differently, when the first distance 84 is defined from the center most hole 54, the plurality of holes 48 may be defined as symmetrically across the face 46 of the base 28 such that the first distance 84 is greater than the second distance 86, which gradually decreases as the plurality of holes 48 spread across the face 46 of the base 28.

If the plurality of holes 48 is disposed at the right portion 40, the first distance 84 may be defined between the axis 76 of the rightmost hole 54 and the axis 76 of the hole 54 immediately adjacent to the left. Therefore, as the plurality of holes 48 extends leftward across the face 46 of the base 28, each hole 54 will be spaced closer to each adjacent hole 54 within either the entirety 72 of the face 46, the right portion 40 in addition to the center portion 38 of the face 46, or the right portion 40 of the face only. If the plurality of holes 48 is disposed at the left portion 42, the first distance 84 may be defined between the axis 76 of the leftmost hole 54 and the axis 76 of the hole 54 immediately adjacent to the right. Therefore, as the plurality of holes 48 extends rightward across the face 46 of the base 28, each hole 54 will be spaced closer to each adjacent hole 54 within either the entirety 72 of the face 46, the left portion 42 in addition to the center portion 38 of the face, or the left portion 42 of the face only.

In at least one other embodiment, the first distance 84 may be less than the second distance 86 and spacing between each axis 76 of each hole 54 may gradually increase in a similar manner as described above. Varying distances between each axis 76 of each hole 54 provides further adjustability of the winch assembly 14. For example, the varying distances between each axis 76 of each hole as described above allows for a variety of objects having different sizes, weights and shapes to be pulled into the bed 12 by the winch 34 using a single winch assembly 14. The versatility of the winch assembly 14 allows for optimization and organization of objects stored on the bed 12 of the vehicle 10.

Referring specifically to FIG. 3, a perspective view of an additional embodiment of the winch assembly 14 is depicted. The winch assembly 14 may further include a cable roller 88. The cable roller 88 may be disposed within and attached to a tailgate 90. The cable roller 88 further aids operation of the winch assembly 14. For example, when the winch 34 is hauling objects, the cable roller 88 may haul the objects in a constant direction 92. The constant direction may be straight, as depicted in FIG. 3, or may be angular based on a position of the cable roller 88.

The cable roller 88 may be configured to maintain a straight, constant direction 92 of a cable 94 regardless of the position of the winch assembly 14. For example, as depicted in FIG. 3, when the winch 34 is centered on the base 28 of the mount 24, the cable roller 88 maintains the cable 94 substantially centered on the tailgate 90. Likewise, in at least one other embodiment, when the winch 34 is disposed on either the right portion 40, or the left portion 42, the cable roller 88 still maintains the cable 94 substantially centered on the tailgate 90. Maintaining the cable 94 substantially centered on the tailgate 90 allows the bracket 36 and the plate 26 to move the winch 34 across the base 28 of the mount 24 as detailed above while still hauling objects into the bed 12 of the vehicle 10. The cable roller 88 further allows the winch assembly 14 adjustability based on the disposition of the winch 34 on the center portion 38, the right portion 40 or the left portion 42.

In at least one other embodiment, the cable roller 88 may be disposed angularly with respect to the tailgate 90. If the cable roller 88 is disposed angularly with respect to the tailgate 90, the cable roller 88 may be configured to haul objects angularly regardless of the position of the winch assembly 14. For example, if the winch 34 is attached to the center portion 38 of the base 28 via the bracket 36 and plate 26, and the cable roller 88 is disposed at an angle (not shown) with respect to the tailgate 90, the cable 94 may change directions based on the angular relation between the cable roller 88 and tailgate 90. Likewise, if the winch 34 is attached to the right or left portions 40, 42 of the base 28 via the bracket 36 and the plate 26 and the cable roller 88 is disposed at an angle with respect to the tailgate 90 being opposite, or different from the position of the winch 34, the cable 94 may change directions based on the angular relation between the cable roller 88 and the winch assembly 14. In a similar manner, if the winch 34 is attached to the right or left portions 40, 42 of the base 28 via the bracket 36 and the plate 26 and the cable roller is disposed at an angle with respect to tailgate 90 being substantially equal or the same from the position of the winch 34, the cable 94 may maintain the constant, straight direction 92.

In yet another embodiment, the cable roller 88 may be configured to be adjustable within the tailgate 90. As depicted and described in FIG. 3, the cable roller 88 may be fixed and stationary on a single location within the tailgate 90. The cable roller 88 may also be configured to adjust positions within the tailgate 90. It may be desirable to haul objects in different directions independent of the winch 34 position on the base 28, as described above. For example, the cable roller 88 may be configured to lock within the tailgate 90 to haul objects in the constant, straight direction 92 and then unlock and rotate positions such that the cable roller 88 is disposed angularly relative to the tailgate 90, and then relock before hauling an object. An adjustable cable roller 88 within the tailgate 90 allows for both optimization of the winch 34 and cable 94 when hauling objects into the bed 12 of the vehicle 10. By providing an adjustable cable roller 88, the winch assembly 14 provides two degrees of adjustability to maximize use of the bed 12 of the vehicle 10.

Providing two degrees of adjustability increases the flexibility of the winch assembly 14. For example, the winch 34 provides adjustability along the base 28 and the cable roller 88 provides adjustability by changing direction within the tailgate 90. Allowing the winch assembly 14 to be adjustable within multiple positions provides greater use of the winch assembly 14 and greater ability to use the winch assembly 14 to haul objects into the bed 12 of the vehicle 10. The adjustability of the winch assembly 14 may also provide for greater organization and stowage of objects within the bed 12 of the vehicle 10. Therefore, the winch assembly 14 allows for greater optimization of the space within the bed 12 and allows the vehicle 10 to haul more or larger objects within the bed 12 of the vehicle 10.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A bed for a pickup truck comprising:
   a floor;
   first and second sidewalls extending perpendicular to the floor on opposite sides of the floor;
   a headboard connected to and disposed between the first and second sidewalls;
   a mount with a base member having first and second ends attached to the first and second sidewalls, respectively, such that a width of the base member extends across the headboard, the base member with a plurality of holes spaced apart along the width of the base member from the first end to the second end; and
   a plate configured to support a winch on the base member of the mount, the plate including a bracket to slide on the base member and to secure the plate at any of the plurality of holes of the base member and adjust a position of the winch along the headboard and relative to the first and second sidewalls;
   wherein each hole of the plurality of holes defines an axis such that a distance between each axis gradually decreases across an entirety of the width of the base member starting at the axis of the center most hole within the plurality of holes.

2. The bed of claim 1, wherein the first and second sidewalls further define first and second pockets, respectively, each pocket located on an upper surface of the associated sidewall and disposed at a distance from the floor such that the first and second pockets are configured to receive the first and second ends, respectively.

3. The bed of claim 2, wherein the first and second ends include first and second legs that extend substantially perpendicularly from the base member and are received by the first and second pockets, respectively, to secure the base member relative to the first and second pockets.

4. The bed of claim 1 further comprising a locking pin configured to extend through the bracket and through one of the plurality of holes to secure the plate to the base member.

5. The bed of claim 1 further comprising a cable roller defined within a tailgate disposed opposite the headboard and extending between the first and second sidewalls, the cable roller configured such that a cable extends between the tailgate and the headboard and is connected to the mount.

6. The bed of claim 5, wherein the cable roller is configured to maintain the cable in a constant direction and prevent transverse movement of the cable relative to the tailgate and cable roller.

7. A winch mount for a truck comprising:
   a base member having first and second ends to attach to first and second sidewalls of a truck bed, the base member having a face with a plurality of holes spaced across an entirety thereof between the first and second ends, a width of the base member sized to extend from the first sidewall to the second sidewall and across a headboard; and
   a plate with a bracket slidably supported on the base member, the plate configured to support a winch on the base member, the bracket defining a bore sized to receive a locking pin to attach the plate to the base member via any of the plurality of holes and adjust a position of the winch relative to the first and second sidewalls; and
   a cable roller disposed within a tailgate and configured to maintain a straight and constant direction of a cable attached to a winch secured to the plate, the cable roller configured to prevent transverse movement of the cable relative to the tailgate and cable roller wherein each hole of the plurality of holes defines an axis such that a distance between each axis gradually decreases across the entirety of the face starting at the axis of the center most hole within the plurality of holes.

8. The winch mount of claim 7, wherein the plurality of holes are spaced equidistant from one another across the entirety of the face.

9. The winch mount of claim 7, wherein the locking pin has a first shaft and a second shaft, the second shaft extending substantially perpendicular from the first shaft and including a key and hole assembly, wherein the second shaft is configured to extend through the bore and one of the plurality of holes to secure the bracket to the base member using the key and hole assembly.

10. The winch mount of claim 7, wherein the locking pin defines a ball locking pin to secure the bracket to the base member.

11. The winch mount of claim 7, wherein a diameter of the bore is substantially equal to a diameter of each hole of the plurality of holes.

* * * * *